(12) United States Patent
Patel et al.

(10) Patent No.: US 7,267,856 B2
(45) Date of Patent: Sep. 11, 2007

(54) ULTRASONIC END STOPS ON ZIPPER CLOSURE BAGS AND METHODS FOR MAKING SAME

(75) Inventors: Asmin T. Patel, Canandaigua, NY (US); Steven P. Long, Canandaigua, NY (US)

(73) Assignee: Pactiv Corporation, Lake Forest, IL (US)

( * ) Notice: Subject to any disclaimer, the term of this patent is extended or adjusted under 35 U.S.C. 154(b) by 427 days.

(21) Appl. No.: 10/265,978

(22) Filed: Oct. 7, 2002

(65) Prior Publication Data

US 2004/0066985 A1  Apr. 8, 2004

(51) Int. Cl.
B29D 22/00 (2006.01)
B29D 23/00 (2006.01)
B32B 1/08 (2006.01)

(52) U.S. Cl. .................. 428/35.2; 428/35.7; 428/500; 383/64; 383/122; 383/203; 383/207; 383/63

(58) Field of Classification Search ............... 428/35.7, 428/352, 500; 382/64, 122, 203, 207, 63
See application file for complete search history.

(56) References Cited

U.S. PATENT DOCUMENTS

| | | | |
|---|---|---|---|
| 2,193,757 A | 3/1940 | Beckwith |
| 2,715,759 A | 8/1955 | Poux |
| 2,807,265 A | 9/1957 | Oliva et al. |
| 3,259,951 A | 7/1966 | Zimmerman |
| 3,389,441 A | 6/1968 | Heimberger |
| 3,722,672 A | 3/1973 | Ebata |
| 3,790,992 A | 2/1974 | Herz |
| 3,903,571 A | 9/1975 | Howell |
| 3,962,007 A | 6/1976 | Heimberger |
| 4,309,233 A | 1/1982 | Akashi |
| 4,756,061 A | 7/1988 | Jones et al. |
| 4,787,755 A | 11/1988 | Branson |
| 4,812,192 A | 3/1989 | Woods et al. |
| 4,890,935 A | 1/1990 | Ausnit et al. |
| 4,957,571 A | 9/1990 | Cipolla |

(Continued)

FOREIGN PATENT DOCUMENTS

CA  648191  9/1962

(Continued)

OTHER PUBLICATIONS

D. Grewell, "Amplitude and Force Profiling: Studies in Ulrtasonic Welding of Thermoplastics," p. 1188-1192, ANTEC '96.

(Continued)

Primary Examiner—Michael C. Miggins
(74) Attorney, Agent, or Firm—Baker Botts L.L.P.

(57) ABSTRACT

Ultrasonic end stops and methods of making ultrasonic end stops are provided The present invention relates to plastic reclosable fasteners with sliders for opening and closing the reclosable fasteners on plastic bags and the like and particularly to the use of protruding end stop structures on reclosable fasteners to prevent travel of sliders past the fastener ends The end stop structures include at least one of high density polyethylene, medium density polyethylene, polypropylene, a cyclic olefin copolymer, a high density material, or a high modulus material and may optionally include low density polyethylene or linear low density polyethylene

17 Claims, 7 Drawing Sheets

U.S. PATENT DOCUMENTS

| | | | |
|---|---|---|---|
| 5,007,142 A | 4/1991 | Herrington | |
| 5,007,143 A | 4/1991 | Herrington | |
| 5,036,643 A | 8/1991 | Bodolay | |
| 5,067,208 A | 11/1991 | Herrington, Jr. et al. | |
| 5,088,971 A | 2/1992 | Herrington | |
| 5,131,121 A * | 7/1992 | Herrington et al. | 24/436 |
| 5,161,286 A | 11/1992 | Herrington, Jr. et al. | |
| 5,189,764 A | 3/1993 | Herrington et al. | |
| 5,405,478 A | 4/1995 | Richardson et al. | |
| 5,442,837 A | 8/1995 | Morgan | |
| 5,448,807 A | 9/1995 | Herrington, Jr. | |
| 5,482,375 A | 1/1996 | Richardson et al. | |
| 5,664,299 A | 9/1997 | Porchia et al. | |
| 5,669,715 A | 9/1997 | Dobreski et al. | |
| 5,682,730 A | 11/1997 | Dobreski | |
| 5,769,772 A | 6/1998 | Wiley | |
| 5,775,812 A | 7/1998 | St. Phillips et al. | |
| 5,788,378 A | 8/1998 | Thomas | |
| 5,833,791 A | 11/1998 | Bryniarski et al. | |
| 5,851,070 A | 12/1998 | Dobreski et al. | |
| 5,896,627 A | 4/1999 | Cappel et al. | |
| 5,911,508 A | 6/1999 | Dobreski et al. | |
| 5,919,535 A | 7/1999 | Dobreski et al. | |
| 5,924,173 A | 7/1999 | Dobreski et al. | |
| 5,938,337 A | 8/1999 | Provan et al. | |
| 5,950,285 A | 9/1999 | Porchia et al. | |
| 5,956,924 A | 9/1999 | Thieman | |
| 5,964,532 A | 10/1999 | St. Phillips et al. | |
| 6,010,244 A | 1/2000 | Dobreski et al. | |
| 6,071,011 A * | 6/2000 | Thomas et al. | 383/64 |
| 6,148,588 A | 11/2000 | Thomas et al. | |
| 6,286,999 B1 | 9/2001 | Cappel et al. | |
| 6,289,561 B1 | 9/2001 | Provan et al. | |
| 6,292,986 B1 | 9/2001 | Provan et al. | |
| 6,361,209 B1 | 3/2002 | LaRue et al. | |
| 6,376,035 B1 | 4/2002 | Dobreski et al. | |
| 6,378,177 B1 | 4/2002 | Athans et al. | |
| 6,385,818 B1 * | 5/2002 | Savicki, Sr. | 24/30.5 R |
| 6,386,760 B1 | 5/2002 | Tomic | 383/5 |
| 6,419,391 B2 | 7/2002 | Thomas | |
| 6,439,770 B2 | 8/2002 | Catchman | |
| 6,470,551 B1 | 10/2002 | Provan et al. | |
| 6,494,018 B1 | 12/2002 | Vanderlee et al. | |
| 6,499,878 B1 | 12/2002 | Dobreski et al. | |
| 6,508,969 B1 * | 1/2003 | Kolovich et al. | 264/252 |
| 6,526,726 B1 | 3/2003 | Strand et al. | |
| 2003/0129331 A1 * | 7/2003 | Chen et al. | 428/34.2 |
| 2003/0213830 A1 * | 11/2003 | Crevier | 228/2.1 |
| 2004/0022460 A1 * | 2/2004 | Plourde et al. | 383/64 |

FOREIGN PATENT DOCUMENTS

| | | |
|---|---|---|
| CA | 844815 | 6/1970 |
| EP | 0 505 057 | 9/1992 |
| GB | 560103 | 10/1944 |
| GB | 812842 | 5/1959 |
| GB | 914203 | 12/1962 |
| WO | WO91/13759 | 9/1991 |
| WO | WO95/35048 | 12/1995 |
| WO | WO 01/94227 | 12/2001 |
| WO | WO 02/14161 | 2/2002 |

OTHER PUBLICATIONS

J. Frantz, "Ultrasonic Application Solutions Using the Latest Advances in Equiqment Technology," p. 1094-1097, ANTEC 2002.

* cited by examiner

ULTRASONIC END STOPS ON ZIPPER CLOSURE BAGS AND METHODS FOR MAKING SAME

FIELD OF THE INVENTION

The present invention relates generally to ultrasonic end stops and methods of making ultrasonic end stops. More particularly, the invention relates to end stops for zipper closure bags with improved strength properties and methods of making such end stops.

BACKGROUND OF THE INVENTION

Plastic bags are in widespread use in a varied and diverse number of household and commercial applications, especially in the food packaging industry One advantage of plastic bags is their ease of opening and resealing. Some of these bags are reclosable via the use of a reclosable feature such as a reclosable fastener. In many bags, the fasteners can be opened and closed either by pressure or by the use of an auxiliary slider mechanism.

Various arrangements have been utilized heretofore to maintain auxiliary slider mechanisms on fasteners. One arrangement which has been used to prevent or inhibit the slider mechanism from going past the ends of the fastener and coming off of the bag is to incorporate opposing end termination clips at the ends of the fastener The use of end termination clips, however, increases the cost of producing the bag as it requires an additional component on the bag and an additional piece of equipment in order to place the end termination clips on the bag. In addition, the placement of end termination clips on the ends of the fastener involves an additional processing step which may not be desirable when manufacturing speeds are important.

To avoid using end termination clips to prevent or inhibit the auxiliary slider mechanism from going past ends of the fastener, an alternative arrangement has been employed which involves shaping material from the fastener into opposing end stops or end stop structures which protrude from the fastener or zipper and engage the slider mechanism to prevent or inhibit it from going past the respective ends of the fastener One method which has been used to shape end stop structures in this fashion has been to ultrasonically smash the opposite ends of the male and female profiles of the fastener to form the protruding end stop structures.

While such protruding end stop structures are effective in preventing the slider mechanism from going past the respective ends of the fastener, many of the materials which have been previously used in forming such protruding end stop structures lack sufficient mechanical strength to hold the slider mechanism on the bag when stresses are applied to the bag during normal bag use. Also, many of the materials which have been previously used in forming such protruding end stop structures require longer welding times and, consequently, slower cycle processing times.

Accordingly, there exists a need for a plastic bag having a slider-operated fastener with protruding end stop structures which may be formed by shaping material from the fastener via shorter weld times and, consequently, shorter processing times There also exists a need for a plastic bag having a slider-operated fastener with protruding end stop structures which may be formed by shaping material from the fastener and which provide improved strength properties to hold the slider mechanism on the bag. There further exists a need for methods of producing such end stop structures.

SUMMARY OF THE INVENTION

The present invention relates to plastic reclosable fasteners with sliders for opening and closing the reclosable fasteners on plastic bags and the like and particularly to the use of protruding end stop structures on reclosable fasteners to prevent travel of sliders past the fastener ends where the end stop structures are made of particular materials.

The invention relates to a polymeric bag which includes first and second opposing body panels that are fixedly connected to each other along a pair of sides and a bottom bridging the pair of sides The bag also includes a reclosable fastener which extends along a mouth formed opposite the bottom. The fastener includes a pair of interlocking flexible plastic tracks which include a male track having a male profile and a female track having a female profile. The bag also includes a slider slidably mounted to the fastener for movement between a closed position and an open position. The bag also includes first and second end stops located at opposite ends of the fastener. Each of the end stops are formed from material at the opposite ends of the fastener and protrude from the fastener a distance adequate to engage the slider and prevent or inhibit movement of the slider past the respective ends of the fastener. The first and second end stops comprise at least one of high density polyethylene, medium density polyethylene, polypropylene, a cyclic olefin copolymer, a high density material, a high modulus material, or combinations or copolymers thereof. The first and second end stops may also further comprise low density polyethylene or linear low density polyethylene.

The invention also relates to a polymeric bag which includes first and second opposing body panels that are fixedly connected to each other along a pair of sides and a bottom bridging the pair of sides. The bag also includes a reclosable fastener which extends along a mouth formed opposite the bottom The fastener includes a pair of interlocking flexible plastic tracks which include a male track having a male profile and a female track having a female profile. The bag also includes a slider slidably mounted to the fastener for movement between a closed position and an open position. The bag further includes end stop means located at opposite ends of the fastener. The end stop means are formed from material at the opposite ends of the fastener and protrude from the fastener a distance adequate to engage the slider and prevent or inhibit movement of the slider past the respective ends of the fastener The end stop means comprise at least one of high density polyethylene, medium density polyethylene, polypropylene, a cyclic olefin copolymer, a high density material, a high modulus material, or combinations or copolymers thereof.

The invention further relates to a method for forming end stops on a polymeric bag using ultrasonic energy. The polymeric bag includes first and second opposing body panels that are fixedly connected to each other along a pair of sides and a bottom bridging the pair of sides. The bag also includes a reclosable fastener which extends along a mouth formed opposite the bottom. The fastener includes a pair of interlocking flexible plastic tracks which include a male track having a male track having a male profile and a female track having a female profile The bag also includes a slider slidably mounted to the fastener for movement between a closed position and an open position. The method involves ultrasonically smashing opposite ends of the male and female profiles at a seal area at opposite ends of the bag. The ultrasonic smashing reduces the thickness of a portion of at least one of the male and female profiles to form first and second end stops located at opposite ends of the fastener.

The male and female profiles and the first and second end stops comprise at least one of high density polyethylene, medium density polyethylene, polypropylene, a cyclic olefin copolymer, a high density material, or a high modulus material A portion of the first and second end stops protrudes an adequate distance from at least a portion of the fastener to prevent the slider from going past respective ends of the fastener In another embodiment, the invention relates to a method for forming end stops on a polymeric bag using a heating and cooling process. The polymeric bag includes first and second opposing body panels that are fixedly connected to each other along a pair of sides and a bottom bridging the pair of sides. The bag also includes a reclosable fastener which extends along a mouth formed opposite the bottom. The fastener includes a pair of interlocking flexible plastic tracks which include a male track having a male track having a male profile and a female track having a female profile. The bag also includes a slider slidably mounted to the fastener for movement between a closed position and an open position. The method involves heating opposite ends of the male and female profiles at a seal area at opposite ends of the bag. The heating reduces the thickness of a portion of at least one of the male and female profiles to form first and second end stops located at opposite ends of the fastener. The male and female profiles and the first and second end stops comprise at least one of high density polyethylene, medium density polyethylene, polypropylene, a cyclic olefin copolymer, a high density material, or a high modulus material. A portion of the first and second end stops protrudes an adequate distance from at least a portion of the fastener to prevent the slider from going past respective ends of the fastener. The method also involves cooling the first and second end stops. The above summary of the present invention is not intended to represent each embodiment, or every aspect, of the present invention This is the purpose of the figures and the detailed description which follow

BRIEF DESCRIPTION OF THE DRAWINGS

The foregoing and other advantages of the invention will become apparent upon reading the following detailed description and upon reference to the drawings

FIG. 3b is an enlarged perspective view of the end stop region in FIG. 3a.

Figure 1:
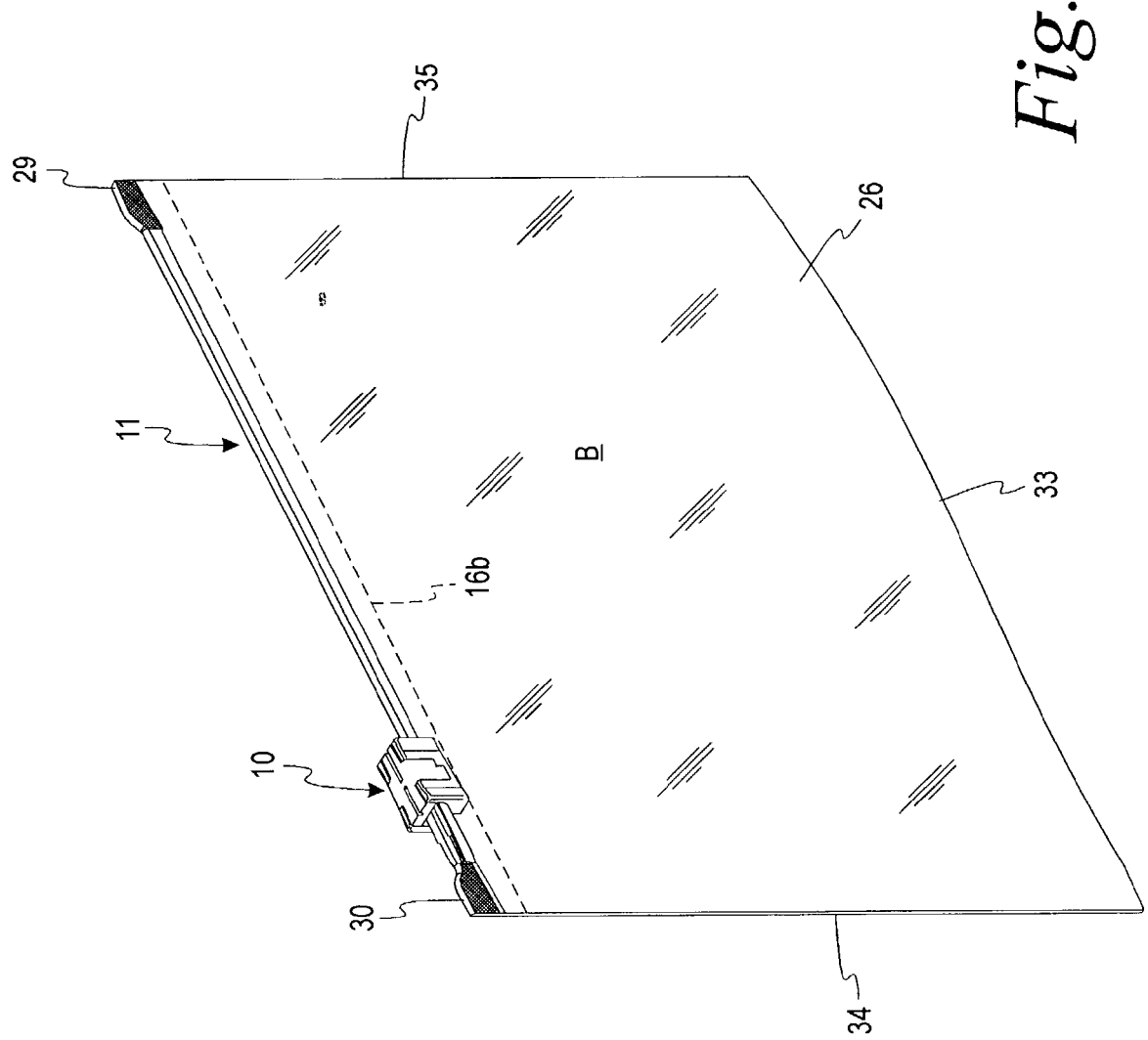
FIG. 1 is a perspective view of a thermoplastic bag having a fastener, a slider, and end stop structures in accordance with one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims

DESCRIPTION OF ILLUSTRATIVE EMBODIMENTS

Turning now to the drawings, in which like reference numerals designate like parts, FIG. 1 depicts a plastic slider mechanism 10 and a profiled plastic fastener or zipper 11. The slider 10 and fastener 11 are particularly suited for thermoplastic bags and the like Slider 10 has been illustrated in FIGS. 2a-2b, 3a-3b, and 4a-4b assembled on the fastener 11 at the top edge or mouth of a thermoplastic bag B The plastic slider 10 and the profiled fastener 11 cooperate to close the bag B. To assist in opening the bag, the slider 10 is slidably mounted to the fastener 11 for movement between a closed position and an open position Bag B (as shown in FIGS. 1-4b) is formed from a single flexible plastic sheet folded upon itself and comprises first and second opposing body panels 25, 26. Body panels 25, 26 are fixedly connected to each other along a pair of sides 34, 35 and a bottom 33 which extends between the pair of sides 34, 35. The fastener 11 (as shown in FIGS. 2a-2b, 3a-3b, and 4a-4b) extends along the top edge or mouth formed opposite the bottom 33 of bag B, in which the fastener 11 has a male track 12 and a female track 13.

Alternatively, bag B may be formed from separate plastic sheets where the first and second opposing body panels are sealed after being initially separated so as to form the pair of sides and the bottom (i.e., sealed on three sides). Alternatively, bag B may be formed from a single flexible plastic sheet having a side fold, a seal on the side opposite the side fold, and an end seal (not shown)

It also contemplated the fastener which is used in bag B may be opened and closed by finger pressure or by an auxiliary squeezing device other than an auxiliary slider mechanism (not shown). In other words, a press to close type fastener may be used in bag B rather than a fastener having a slider 10 as shown in FIGS. 1-4b. Where a press to close type fastener is used in bag B, the tracks may have integrally formed profiles and fins.

Alternatively, bag B (not shown) may be a stand-up polymeric bag which comprises first and second opposing body panels and a bottom wall and a reclosable feature or fastener, such as a reclosable zipper, which can be opened and closed either by the use of an auxiliary slider mechanism, by finger pressure, or by an auxiliary squeezing device other than an auxiliary slider mechanism The first and second opposing body panels are coupled to opposing portions of the bottom wall. The bottom wall may be a gusseted bottom wall comprising gusseted portions or may be comprised of configurations other than a gusseted bottom wall. One example of a stand-up polymeric bag is shown in U.S. Pat. No. 6,148,588 to Thomas et al.

As shown in FIGS. 2a-2b, 3a-3b, and 4a-4b, male and female tracks 12, 13 have interlocking male and female profiles 14, 15 extending the length thereof in the form of rib and groove elements on the respective tracks The male track 12 includes a male profile 14 and a first depending fin or flange 16a extending downward from the male profile 14. Likewise, the female track 13 includes a female profile 15 and a second depending fin or flange 16b extending downward from the female profile 15. The fins 16*a*, 16*b* are shown attached to opposing body panels 25, 26 The tracks 12, 13 may be extruded separately with fins 16*a*, 16*b* and attached to the respective sides of the bag mouth or the tracks 12, 13 may be extruded integral with the sides of the bag mouth. If the tracks 12, 13 are extruded separately, they are most effectively attached by means of the respective first and second fins 16*a*, 16*b*, incorporated within the tracks, such as by heat sealing to the bag mouth.

The male and female profiles 14, 15 have complementary cross-sectional shapes. The cross-sectional shapes of the interlocking male and female profiles 14, 15 shown in FIGS. 2*a*-2*b*, 3*a*-3*b*, and 4*a*-4*b* are the subject of the invention claimed in U.S. Pat. No. 5,007,143 to Herrington which is incorporated herein by reference in its entirety.

In the open position of the slider 10, the male and female profiles 14, 15 are disengaged from each other so that a user can gain access to the interior of the bag B. Movement of the slider 10 from the open position to the closed position interlocks the male and female profiles 14, 15 so as to restrict access to the interior of the bag B For example, the male and female profiles 14, 15 may be rolled or pressed into their interlocking arrangement so as to securely close the bag by one of two means First, the profiles may be rolled or pressed together at one end by a user and then sequentially fitted together along the length of the fastener by the user running a finger along the length of the fastener on each side of the profiles. Alternatively, some bags employ a plastic slider that rides along the tracks of the fastener. If the slider is pulled in one direction, the bag is sealed shut; if the slider is pulled in the opposite direction, the bag is reopened.

As may be seen in FIGS. 2*a*-2*b*, 3*a*-3*b*, and 4*a*-4*b*, the slider 10 straddles the fastener 11 at the top of the bag B and is adapted for opening or closing the interlocking tracks 12, 13 of the fastener 11. The slider 10 may be molded from any suitable plastic including, but not limited to, nylon, polypropylene, polyethylene, polystyrene, copolymers of polyethylene and polypropylene, polycarbonates, polyesters, polyacetals, acrylic-butadiene-styrene copolymers, or combinations thereof.

As shown in FIGS. 2*a*-2*b*, 3*a*-3*b*, and 4*a*-4*b*, the slider 10 comprises an inverted generally U-shaped member including a transverse support member or body 17 from which the separator finger 18 extends downward. The body 17 is itself U-shaped and includes two integral legs 19 extending downward. The finger 18 is positioned between the legs 19. The body 17 is adapted to move along the top edges of the tracks 12, 13 with the legs 19 straddling these elements and the finger 18 positioned between the tracks 12, 13. The slider 10 also includes a pair of hinged "wings" 20, 21 that can be folded down into their final position. The wings 20, 21 are hinged to the main slider body 17 by means of hinge structures 20*a*, 21*a* located at the opposite ends of the legs 19.

The foldable depending wings or side walls 20, 21 extend from an opening end 10*b* of the slider 10 to a closing end 10*a*. It is noted that the main slider body 17 and the separator finger 18 are wider at the opening end 10*b* than at the closing end 10*a*. Similarly, the side walls 20, 21 and the legs 19 are spaced wider apart at the opening end 10*b* of the slider 10 to permit separation of the male and female profiles 14, 15 by the finger 18 engaging the tracks 12, 13 The wings 20, 21 and legs 19 are spaced sufficiently close together at the closing end 10*a* of the slider to press the male and female profiles 14, 15 into an interlocking relationship as the slider 10 is moved in a fastener closing direction As shown in FIGS. 2*a*-2*b*, 3*a*-3*b*, and 4*a*-4*b*, the side walls 20, 21 at their lower ends are provided with an inwardly extending shoulder structure 22. Shoulder structure 22 engages a bottom of the fastener 11 to prevent slider 10 from being lifted off the edges of the tracks 12, 13 while the slider 10 straddles the fastener 11.

The opposite ends of the fastener 11 are provided with end stop structures as shown in FIGS. 1-4*b*. A portion of the end stop structures protrudes from the fastener 11 a distance adequate to engage the slider 10 and prevent the slider 10 from going past the respective ends of the fastener 11 and coming off the ends of the bag B. A portion of the end stops may protrude an adequate distance in the transverse direction to engage the slider 10 and prevent movement of the slider 10 past the respective ends of the fastener 11 As used herein, transverse means any direction which is normal to the axis of the track. For example, a portion of the end stops may protrude an adequate distance in a generally horizontal or generally vertical direction to engage the slider 10 and prevent movement of the slider 10 past the respective ends of the fastener 11. Additionally or alternatively, a portion of the end stops may protrude an adequate distance upwardly and/or outwardly from a remainder of the fastener 11 to engage the slider 10 and prevent movement of the slider 10 past the respective ends of the fastener 11 Additional details concerning the formation of the end stops may be obtained from U.S. Pat. No. 5,131,121 to Herrington, which is incorporated herein by reference in its entirety. In some embodiments, the thicknesses of the end stops at their widest point may vary from generally about 0.005 inches to about 0.1570 inches.

Figure 2A:
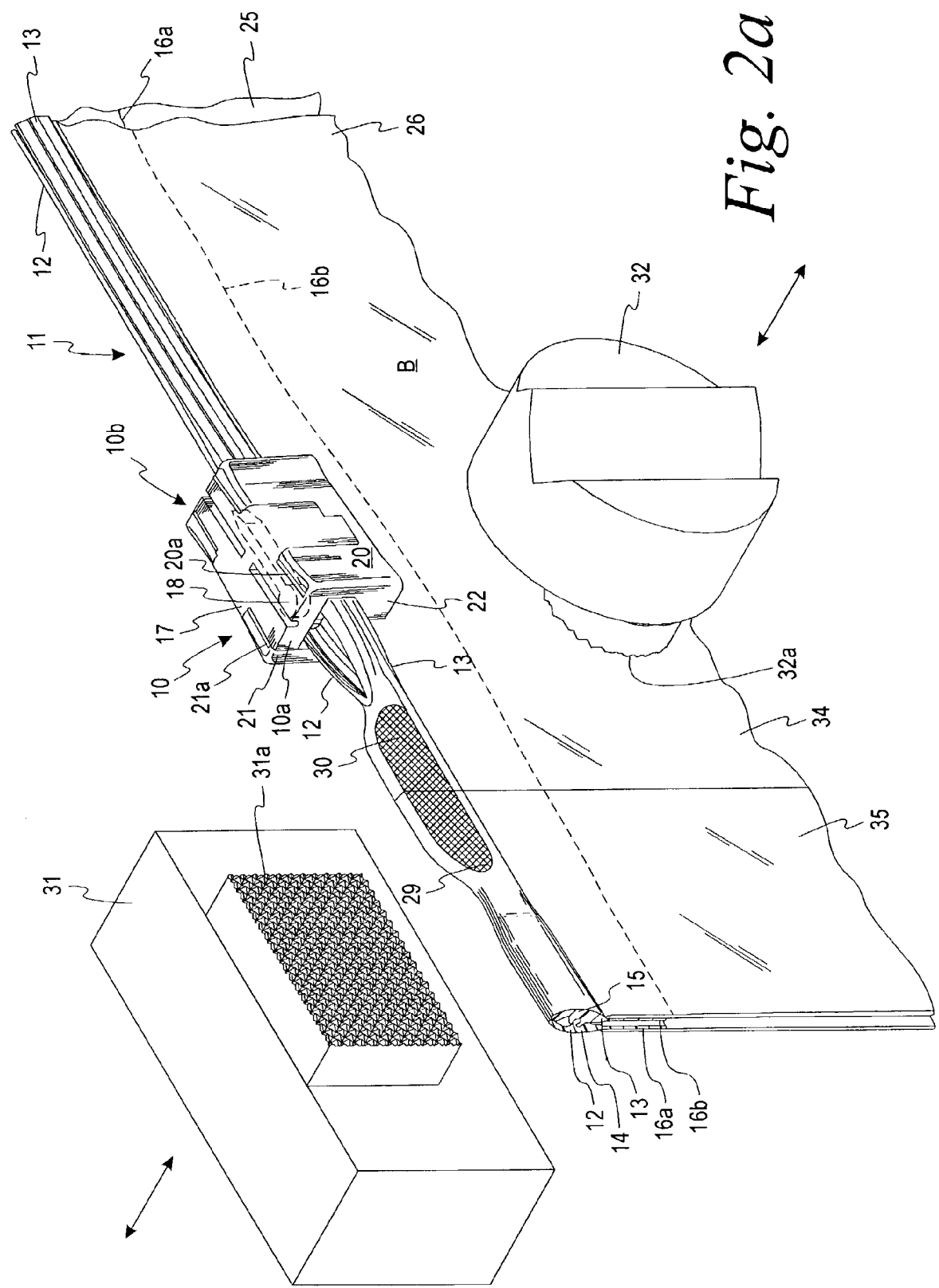
FIG. 2a is an enlarged perspective view of the fastener, slider, and end stop structures of FIG. 1 in assembled position on a thermoplastic bag. The end stop region has end stop structures formed in accordance with one embodiment of the invention.
Figure 2B:
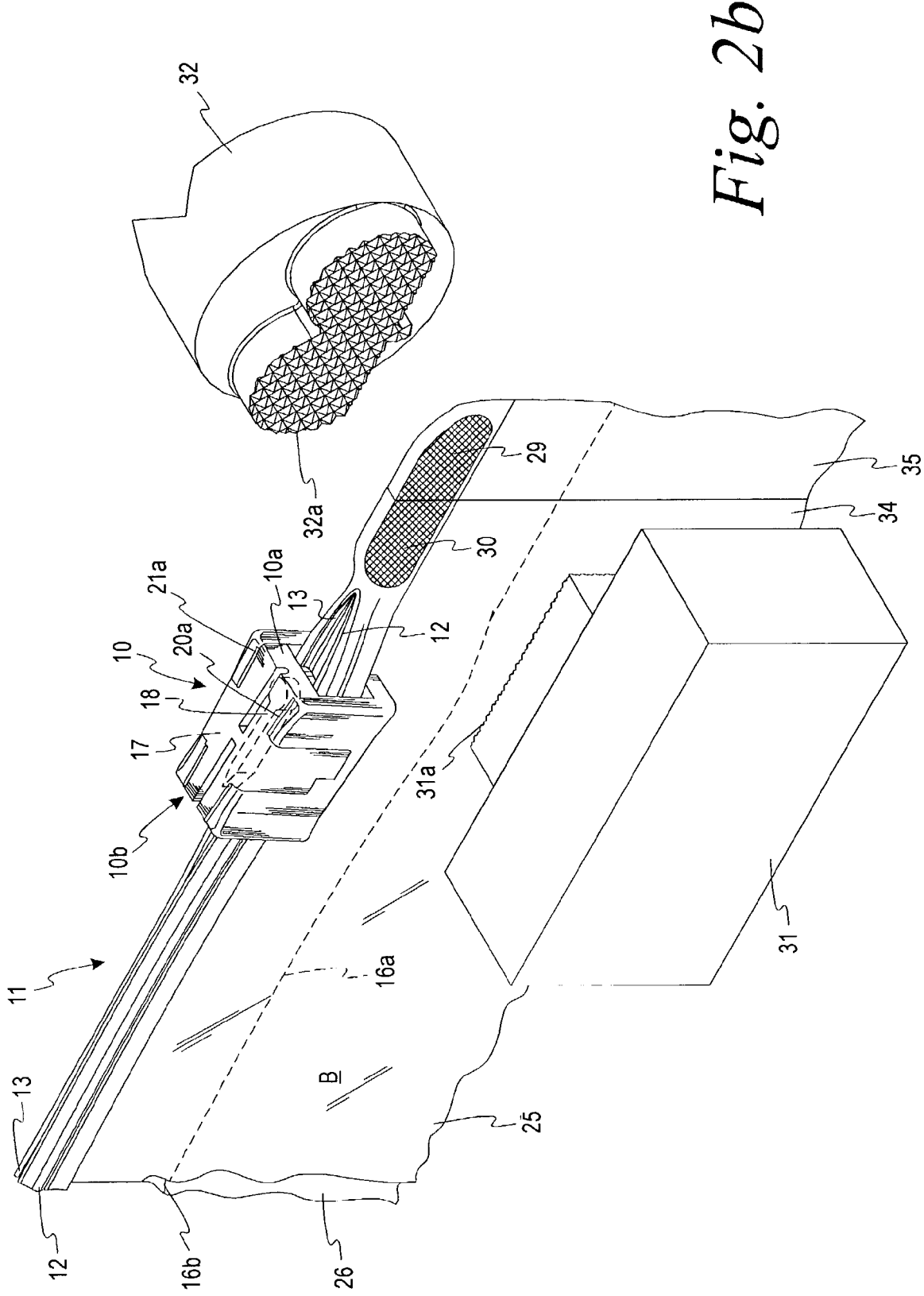
FIG. 2b is an enlarged perspective view of the fastener, slider, and end stop structures of FIG. 2a in assembled position on the opposite side of the thermoplastic bag.

FIGS. 1 and 2*a*-2*b* illustrate one manner in which the end stops of the present invention may be formed. As shown in FIGS. 2*a*-2*b*, a reciprocating anvil-horn assembly is used to form the end stops 29, 30. The reciprocating anvil-horn assembly comprises an anvil 31 and a horn 32. Either both the anvil 31 and the horn 32 move back and forth or one of the anvil or horn moves back and forth while the other remains stationary The anvil 31 and horn 32 of the anvil-horn assembly shown in FIGS. 2*a*-2*b* are each provided with anvil cavities 31*a*, 32*a*, respectively, which engage the opposite sides of the fastener 11 and produce protruding portions on the opposite sides of the track ends of the fastener 11 in the form of integrally formed end stops 29, 30.

The anvil-horn assembly ultrasonically smashes the opening end 10*b* of the fastener 11 on bag B to produce integrally formed end stop 29 while concurrently ultrasonically smashing the closing end 10*a* of the adjacent fastener 11 on adjacent bag B to produce integrally formed end stop 29. When the slider 10 is moved from the closing end 10*a* to the opening end 10*b* of the fastener 11, the closing end 10*a* of the slider 10 engages the integrally formed end stop at the opposing end (not shown) of the fastener 11. When the slider 10 is moved from the opening end 10*b* to the closing end 10*a* of the fastener 11, the closing end 10*a* of the slider 10 engages integrally formed end stop 30.

In the embodiment shown in FIGS. 2*a*-2*b*, the anvil-horn assembly ultrasonically smashes the track ends of the fastener 11 to produce protruding portions on the opposite sides of the track ends of the fastener 11 in the form of integrally formed end stops 29, 30 The end stops 29, 30 shown in the embodiment in FIGS. 2*a*-2*b* may be formed by ultrasonically smashing the upper portion of the male and female profiles 14, 15 of the fastener The lower portion of the male profile 14 and/or the lower portion of the female profile 15 may also be smashed during the ultrasonic smashing process. It is also contemplated that the lower portion of the male and female profiles 14, 15 of the fastener may remain unaltered during the ultrasonic smashing process. Each of the end stops 29, 30 is formed from the material at the opposite ends of the fastener 11.

In the embodiment depicted in FIGS. 2a-2b, the fins 16a, 16b and the opposing body panels 25, 26 remain unaltered during the ultrasonic smashing of the upper portion of the male and female profiles 14, 15. Because the lower portion of the male and female profiles 14, 15 are not altered during the ultrasonic smashing step, the shoulder structure 22 can engage the bottom portion of the male profile 14 and/or the female profile 15 as the slider 10 moves between open and closed positions. The end stops 29, 30 protrude from the fastener 11 an adequate distance in the transverse direction to engage the slider 10 and prevent the slider 10 from going past the respective ends of the fastener 11 and coming off the ends of the bag B.

Figure 3A:
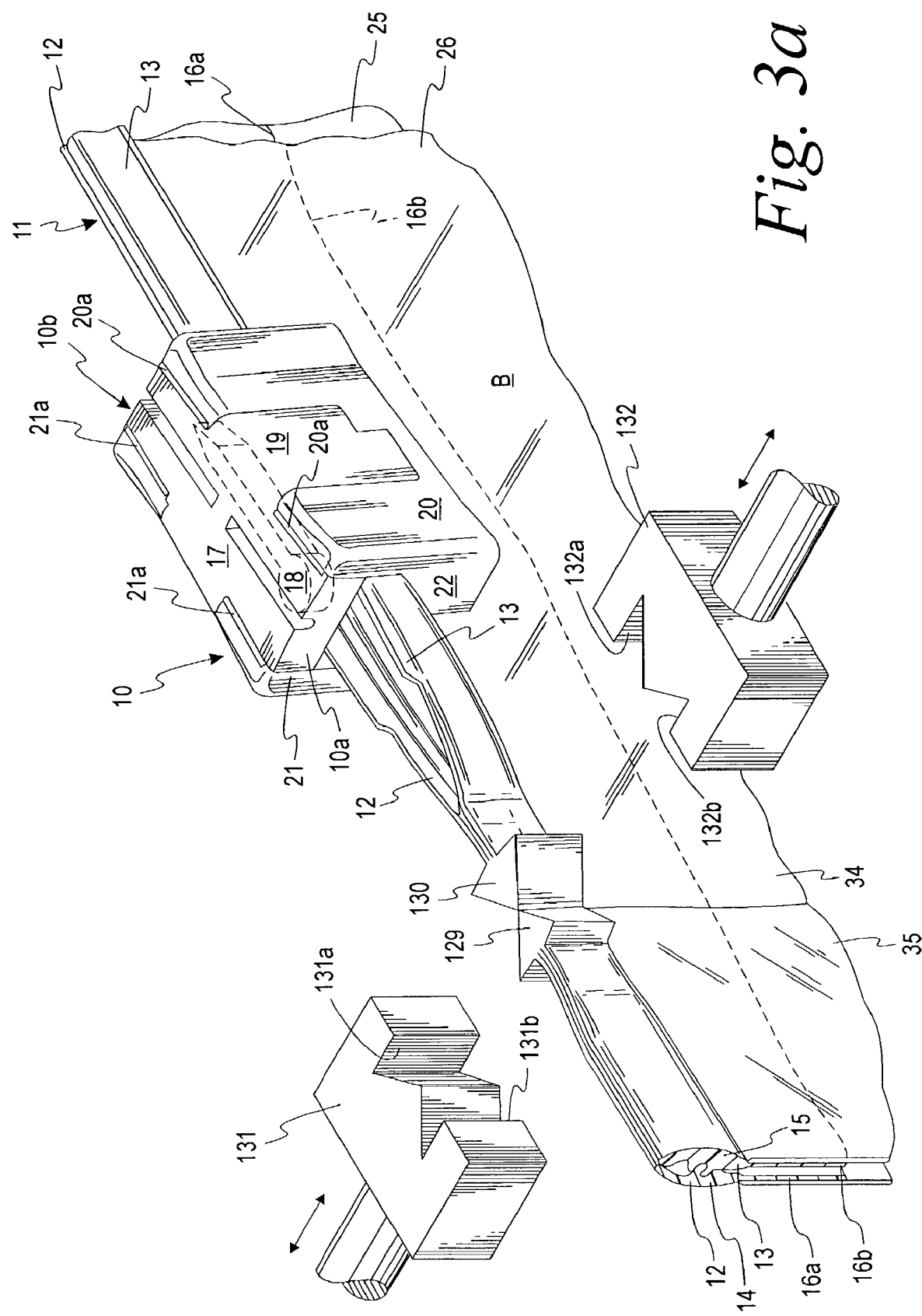
FIG. 3a is an enlarged perspective view of the fastener, slider, and end stop structures in assembled position in accordance with a further embodiment of the invention.
Figure 3B:
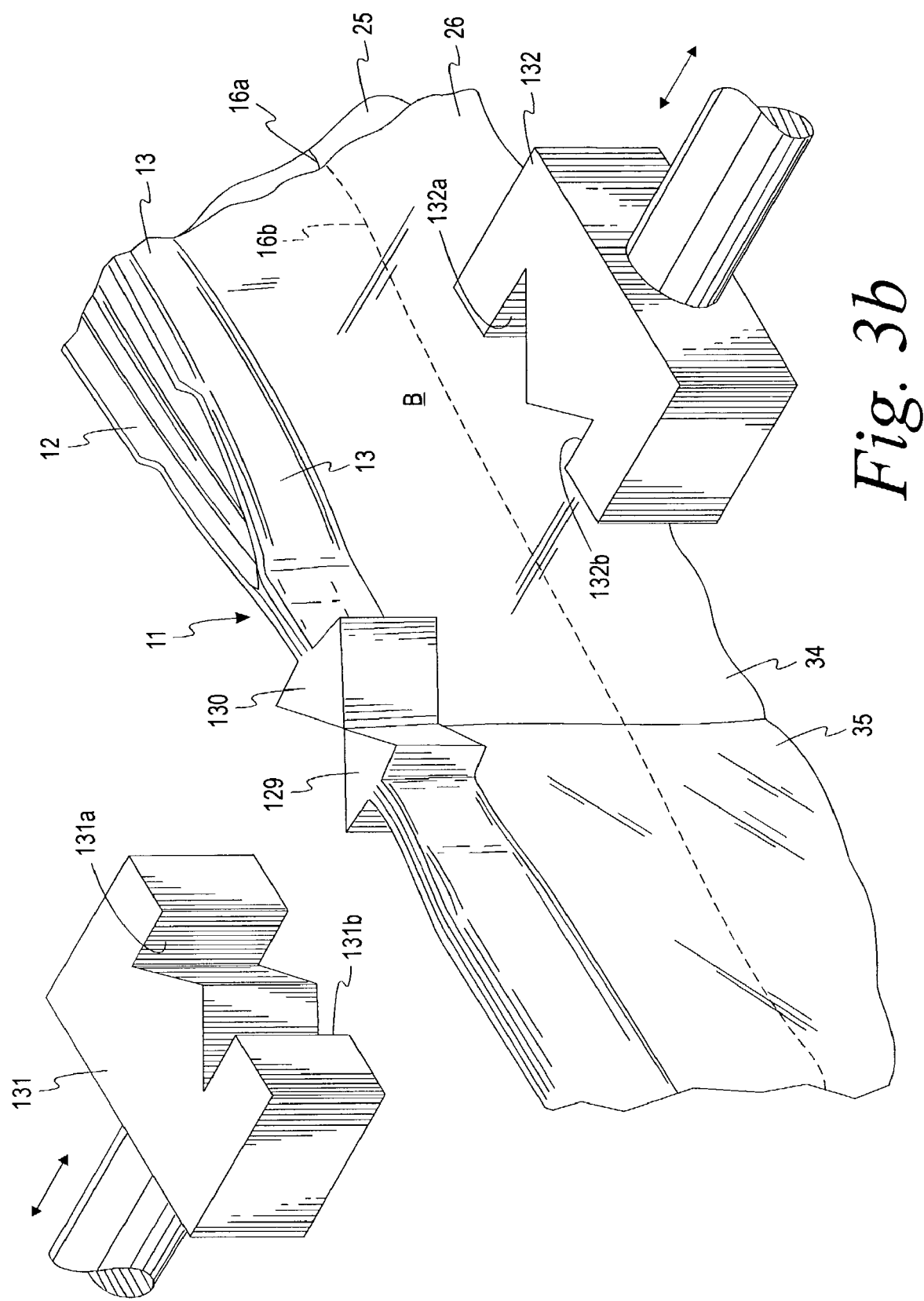

FIGS. 3a-3b show an alternative reciprocating anvil-horn assembly that may be used to form end stops on the ends of the bag B. Either both the anvil 131 and the horn 132 move back and forth or one of the anvil or horn moves back and forth while the other remains stationary. The anvil 131 and horn 132 of the anvil-horn assembly shown in FIGS. 3a-3b are each provided with cooperating recesses 131a, 131b and 132a, 132b, respectively, which engage the opposite sides of the fastener 11 and produce protruding portions on the opposite sides of the track ends of the fastener 11 in the form of integrally formed end stops 129, 130.

The end stops 129, 130 shown in the embodiment in FIGS. 3a-3b may be formed by ultrasonically smashing the entire male and female profiles 14, 15 of the fastener. It is also contemplated that the end stops 129, 130 shown in the embodiment in FIGS. 3a-3b may alternatively be formed by ultrasonically smashing a portion of the male and female profiles 14, 15 As described above with respect to FIGS. 2a-2b, each of the end stops 129, 130 is formed from the material at the opposite ends of the fastener 11.

In the embodiment depicted in FIGS. 3a-3b, the fins 16a, 16b and the opposing body panels 25, 26 remain unaltered during the ultrasonic smashing of the male and female profiles 14, 15. The shoulder structure 22 engages the bottom portion of the male profile 14 and/or the female profile 15 as the slider 10 moves between open and closed positions. The end stops 129, 130 protrude from the fastener 11 an adequate distance in the transverse direction to engage the slider 10 and prevent the slider 10 from going past the respective ends of the fastener 11 and coming off the ends of the bag B.

The anvil-horn assembly shown in FIGS. 3a-3b ultrasonically smashes the opening end 10b of the fastener 11 on bag B to produce integrally formed end stop 130 while concurrently ultrasonically smashing the closing end 10a of the adjacent fastener 11 on adjacent bag B to produce integrally formed end stop 129. As described above with respect to FIGS. 2a-2b, the end stops 129, 130 prevent or inhibit movement of the slider 10 past the ends of the bag B. As described above with respect to FIGS. 2a-2b, when the slider 10 is moved from the closing end 10a to the opening end 10b of the fastener 11, the closing end 10a of the slider 10 engages the integrally formed end stop at the opposing end (not shown) of the fastener 11. When the slider 10 is moved from the opening end 10b to the closing end 10a of the fastener 11, the closing end 10a of the slider 10 engages integrally formed end stop 130

Figure 4A:
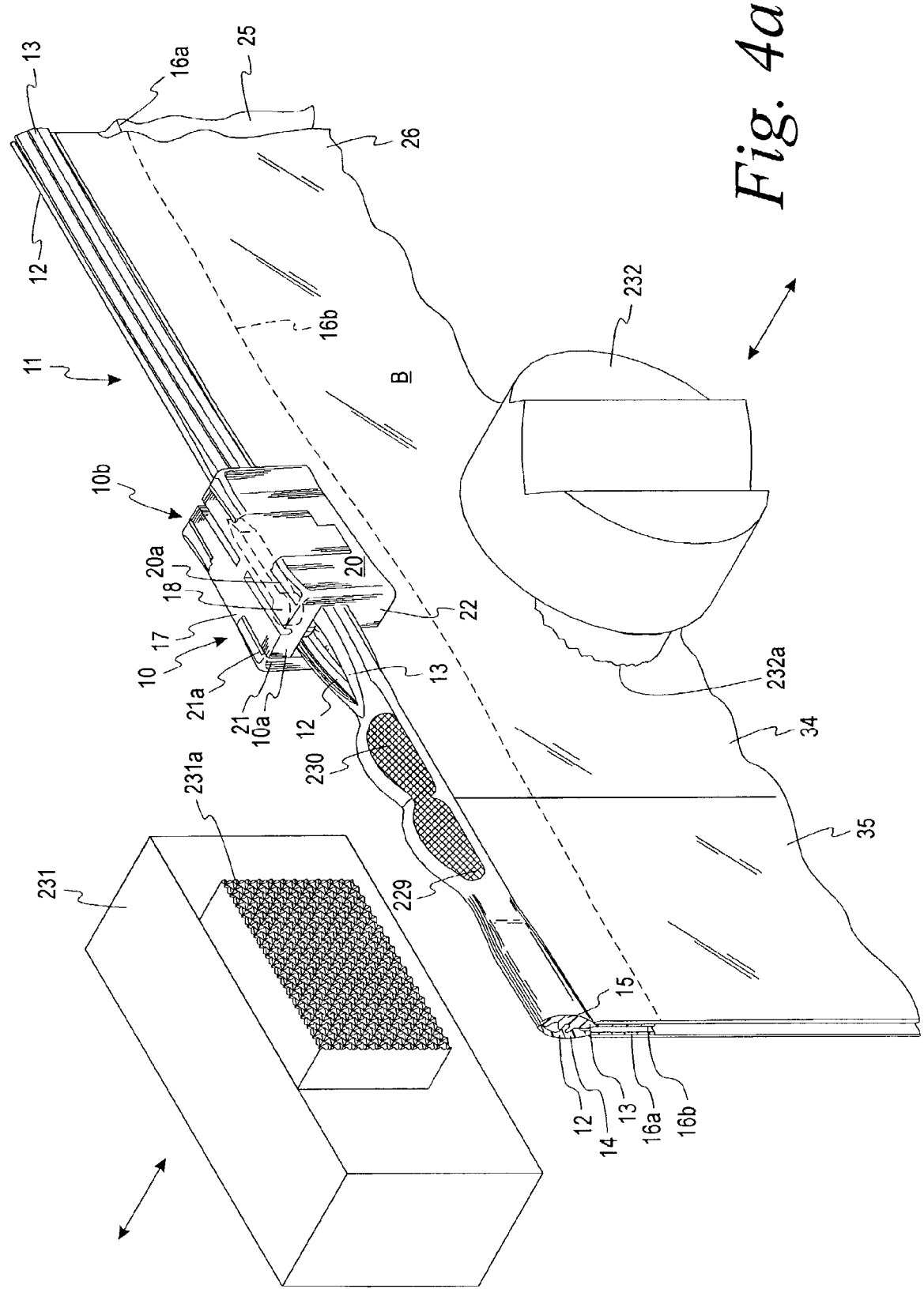
FIG. 4a is an enlarged perspective view of the fastener, slider, and end stop structures in assembled position in accordance with a still further embodiment of the invention.
Figure 4B:
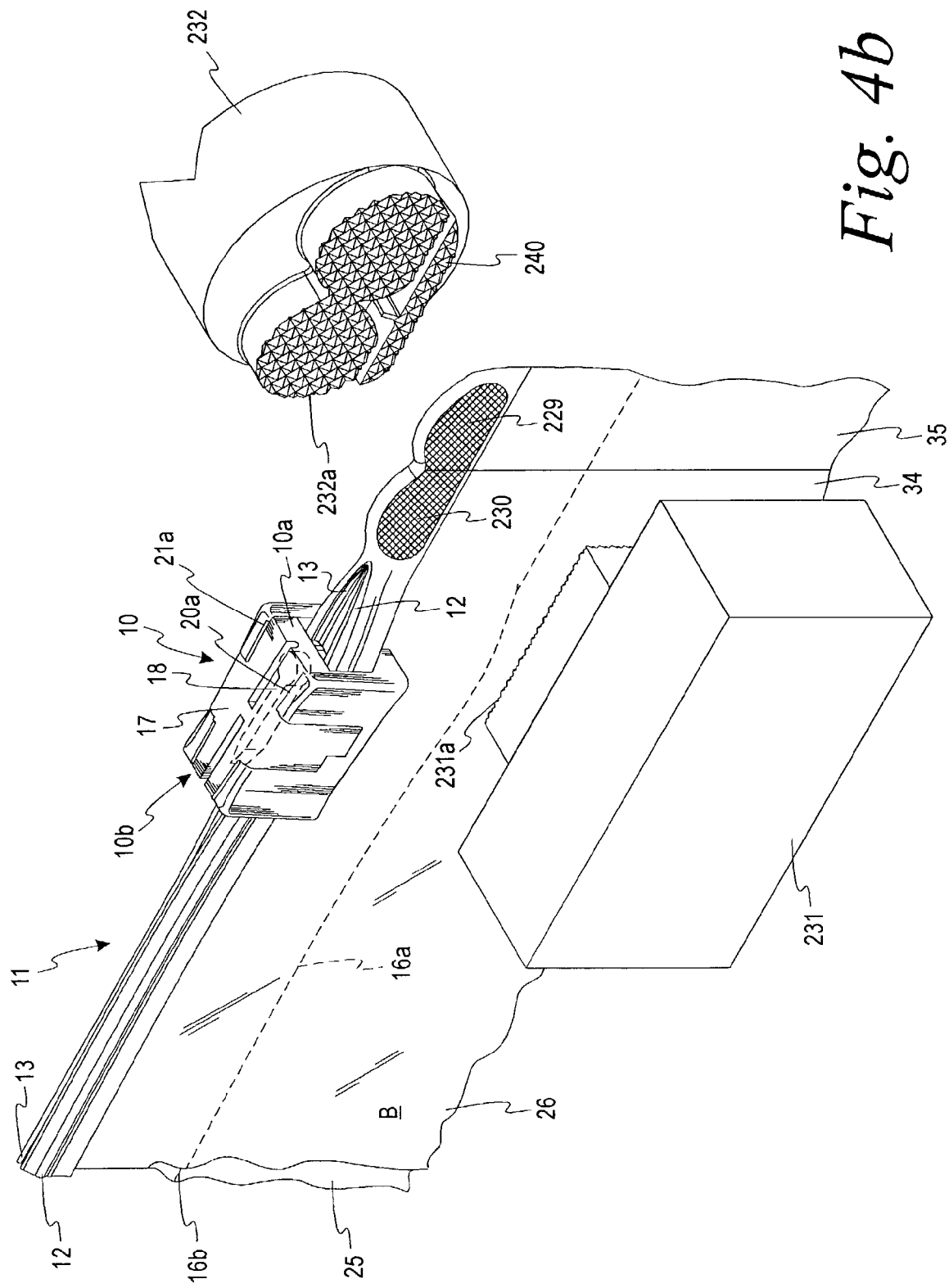
FIG. 4b is an enlarged perspective view of the fastener, slider, and end stop structures of FIG. 4a in assembled position on the opposite side of the thermoplastic bag.

FIGS. 4a-4b show another alternative reciprocating anvil-horn assembly that may be used to form end stops on the ends of the bag B. As described above with respect to FIGS. 1, 2a-2b, and 3a-3b, either both the anvil 231 and the horn 232 move back and forth or one of the anvil or horn moves back and forth while the other remains stationary. The anvil 231 and horn 232 of the anvil-horn assembly shown in FIGS. 4a-4b are each provided with anvil cavities 231a, 232a, respectively, which engage the opposite sides of the fastener 11 and produce protruding portions on the opposite sides of the track ends of the fastener 11 in the form of integrally formed end stops 229, 230. The horn 232 includes a profile portion 240 which assists in forming the rounded shape of the lower portions of the end stops 229, 230

In the embodiment shown in FIGS. 4a-4b, the anvil-horn assembly ultrasonically smashes the track ends of the fastener 11 to produce protruding portions on the opposite sides of the track ends of the fastener 11 in the form of integrally formed end stops 229, 230. The end stops 229, 230 shown in the embodiment in FIGS. 4a-4b may be formed by ultrasonically smashing the entire male and female profiles 14, 15 of the fastener The end stops 229, 230 may alternatively be formed by ultrasonically smashing a portion of the male and female profiles 14, 15 As described above with respect to FIGS. 2a-2b and 3a-3b, each of the end stops 229, 230 is formed from the material at the opposite ends of the fastener 11.

In the embodiment depicted in FIGS. 4a-4b, the fins 16a, 16b and the opposing body panels 25, 26 remain unaltered during the ultrasonic smashing of the male and female profiles 14, 15 The shoulder structure 22 engages the bottom portion of the male profile 14 and/or the female profile 15 as the slider 10 moves between open and closed positions. The end stops 129, 130 protrude from the fastener 11 an adequate distance in the transverse direction to engage the slider 10 and prevent the slider 10 from going past the respective ends of the fastener 11 and coming off the ends of the bag B.

The anvil-horn assembly shown in FIGS. 4a-4b ultrasonically smashes the opening end 10b of the fastener 11 on bag B to produce integrally formed end stop 230 while concurrently ultrasonically smashing the closing end 10a of the adjacent fastener 11 on adjacent bag B to produce integrally formed end stop 229. As described above in connection with FIGS. 2a-2b and 3a-3b, the end stops 229, 230 prevent or inhibit movement of the slider 10 past the ends of the bag B. Also as described above in connection with FIGS. 2a-2b and 3a-3b, when the slider 10 is moved from the closing end 10a to the opening end 10b of the fastener 11, the closing end 10a of the slider 10 engages the integrally formed end stop at the opposing end (not shown) of the fastener 11. When the slider 10 is moved from the opening end 10b to the closing end 10a of the fastener 11, the closing end 10a of the slider 10 engages integrally formed end stop 230.

Although the slider has been described herein with reference to the slider 10 shown in FIGS. 1-4b, it is contemplated that any type of slider which can be placed on the tracks of the fastener and move along the tracks of the fastener may be used in connection with the devices and methods described herein Suitable sliders for use in the present devices and methods may, for example, be snapped, inserted, pushed, and/or molded onto the tracks It is contemplated that suitable sliders may be made of single or multiple pieces of any suitable plastic material(s)

It is also contemplated that end stops having shapes other than those illustrated in FIGS. 2a-2b, 3a-3b, and 4a-4b and described herein may be formed by the methods described herein. The end stops may be shaped in the form of, but are not limited to, flares, bumps, or welds The end stops which are formed by the methods described herein correspond to and reflect the shape of the horn portion of the anvil-horn assembly The end stops formed by the inventive methods protrude from the fastener an adequate distance in any direction which engages the slider and prevents the slider from going past the respective ends of the fastener and coming off the ends of the bag.

It is further contemplated that anvil-horn assemblies having shapes other than those illustrated in FIGS. 2a-2b, 3a-3b, and 4a-4b may be utilized in producing end stops at the ends of the fastener so long as the end stops are formed from the material at the ends of the fastener. By using the anvil-horn assemblies as described herein, the fastener is provided with end stops which prevent or inhibit the slider from going past the end of the fastener and coming off of the bag without requiring additional structure(s) separate from the fastener, such as end termination clip(s), to be placed on the bag to keep the slider on the bag.

The end stops of the present invention such as those shown in FIGS. 2a-2b as items 29, 30, in FIGS. 3a-3b as items 129, 130, and in FIGS. 4a-4b as items 229, 230 comprise at least one polymeric material which possesses superior strength properties. It is contemplated that the polymeric materials used in the profiles and consequently in forming the end stops of the bag B include at least one of high density polyethylene (HDPE), medium density polyethylene (MDPE), polypropylene (PP), a cyclic olefin copolymer (COC), a high density material, or a high modulus material.

It is also contemplated that the profiles and consequently the end stops formed therefrom may include combinations of one or more of high density polyethylene, medium density polyethylene, polypropylene, a cyclic olefin copolymer, a high density material, or a high modulus material. In other words, the end stops of the bag B may be formed of high density polyethylene (HDPE), medium density polyethylene (MDPE), polypropylene (PP), a cyclic olefin copolymer (COC), a high density material, a high modulus material, and combinations or copolymers thereof.

The profiles and, consequently, the end stops may comprise 100 wt. % of high density polyethylene, medium density polyethylene, polypropylene, or a cyclic olefin copolymer In some embodiments, the profiles and end stops comprise from about 1 wt. % to about 99 wt. % of high density polyethylene, medium density polyethylene, polypropylene, or a cyclic olefin copolymer. In other embodiments, the profiles and end stops comprise from about 5 wt % to about 95 wt % of high density polyethylene, medium density polyethylene, polypropylene, or a cyclic olefin copolymer In still further embodiments, the profiles and end stops comprise from about 25 wt % to about 75 wt. % of high density polyethylene, medium density polyethylene, polypropylene, or a cyclic olefin copolymer. In still other embodiments, the profiles and end stops comprise from about 40 wt. % to about 60 wt % of high density polyethylene, medium density polyethylene, polypropylene, or a cyclic olefin copolymer.

Examples of suitable high density materials or high modulus materials include, but are not limited to, nylons, polystyrenes, polycarbonates, polyethylene terephthalate, and ethylene-styrene interpolymers. The profiles and, consequently, the end stops may comprise 100 wt. % of a suitable high density material or a high modulus material. In some embodiments, the profiles and end stops comprise from about 5 wt. % to about 30 wt. % of a high density material or a high modulus material In other embodiments, the profiles and end stops comprise from about 5 wt. % to about 10 wt % of a high density material or a high modulus material.

It is also contemplated that the high density polyethylene, medium density polyethylene, polypropylene, cyclic olefin copolymer, high density material and/or high modulus material used in the profiles and consequently in forming the end stops of the bag may include other additional polymeric materials that add strength and stiffness properties (i.e., one or more polymeric material other than high density polyethylene, medium density polyethylene, polypropylene, a cyclic olefin copolymer, a high density material, and/or a high modulus material). In other words, the end stops may comprise high density polyethylene, medium density polyethylene, polypropylene, a cyclic olefin copolymer, a high density material, or a high modulus material with one or more additional polymeric material(s) that add strength and stiffness properties Examples of suitable additional polymeric materials for use in the profiles and consequently in forming the end stops of the bag include, but are not limited to, low density polyethylene (LDPE) or linear low density polyethylene (LLDPE). In other words, the end stops may be formed from a combination of low density polyethylene or linear low density polyethylene with one or more of high density polyethylene, medium density polyethylene, polypropylene, a cyclic olefin copolymer, a high density material, or a high modulus material Where a combination of low or linear low density polyethylene with one or more of high density polyethylene, medium density polyethylene, polypropylene, a cyclic olefin copolymer, a high density material, or a high modulus material is used, the end stops may comprise from about 1 wt. % to about 99 wt. % of low or linear low density polyethylene. In other embodiments where a combination of low or linear low density polyethylene with one or more of high density polyethylene, medium density polyethylene, polypropylene, a cyclic olefin copolymer, a high density material, or a high modulus material is used, the end stops may comprise from about 1 wt % to about 95 wt. % of low or linear low density polyethylene.

In still other embodiments having a combination of low or linear low density polyethylene with one or more of high density polyethylene, medium density polyethylene, polypropylene, a cyclic olefin copolymer, a high density material, or a high modulus material, the end stops may comprise from about 25 wt. % to about 75 wt % of low or linear low density polyethylene. In still further embodiments having a combination of low or linear low density polyethylene with one or more of high density polyethylene, medium density polyethylene, polypropylene, a cyclic olefin copolymer, a high density material, or a high modulus material, the end stops may comprise from about 40 wt. % to about 60 wt. % of low or linear low density polyethylene.

Examples of additional suitable combinations of materials for use in embodiments of the invention include, but are not limited to, from about 25 wt. % to about 60 wt % high density polyethylene and from about 75 wt % to about 40 wt. % low or linear low density polyethylene, from about 25 wt. % to about 60 wt. % polypropylene and from about 75 wt % to about 40 wt. % low or linear low density polyethylene, about 45 wt % high density polyethylene, about 45 wt % low or linear low density polyethylene, and about 10 wt. % cyclic olefin copolymer, from about 90 wt % to about 95 wt. % low or linear low density polyethylene and from about 5 wt. % to about 10 wt % cyclic olefin copolymer; and from about 80 wt % to about 90 wt % low or linear low density polyethylene and from about 10 wt % to about 20 wt. % cyclic olefin copolymer The use of one or more of high density polyethylene, medium density polyethylene, polypropylene, a cyclic olefin copolymer, a high density material, or a high modulus material in the end stops of the bag B significantly shortens the weld time for forming the end stops and, consequently, results in a shorter processing cycle time and a faster overall processing speed for producing the bag B The use of one or more of high density polyethylene, medium density polyethylene, polypropylene, a cyclic olefin copolymer, a high density material, or a high modulus material in the end stops generally produces a harder end stop which is easier to weld in comparison to end stops formed of low density polyethylene alone The use of one or more of high density polyethylene, medium density polyethylene, polypropylene, a cyclic olefin copolymer, a high density material, or a high modulus material in the end stops as described herein significantly improves the strength of the end stop region of the bag B, particularly in comparison to an end stop formed of low density polyethylene alone. The use of one or more of high density polyethylene, medium density polyethylene, polypropylene, a cyclic olefin copolymer, a high density material, or a high modulus material in the end stops as described herein generally assists in maintaining the slider 10 on the bag B when normal stresses are applied to the bag B.

The amount and the type of material which is selected for use in the profiles 14, 15 of the fastener and consequently in forming the end stops of the bag B depend on a variety of factors including, but not limited to, customer requirements, the applications in which the bags are used, the other materials which are used in the end stops, the desired properties of the bags such as the desired strength properties, cost considerations, processing speed considerations, and weld time considerations.

The end stops, such as shown in FIGS. 1-4b, may be formed from mono-layer or multi-layer combinations of one or more of high density polyethylene, medium density polyethylene, polypropylene, a cyclic olefin copolymer, a high density material, or a high modulus material. It is also contemplated that the end stops may be comprised of coextrusions, alloys, laminations, or coatings of one or more of high density polyethylene, medium density polyethylene, polypropylene, a cyclic olefin copolymer, a high density material, or a high modulus material.

The term polypropylene as used herein includes polymers of propylene or polymerizing propylene with other aliphatic polyolefins, such as, but not limited to, ethylene, 1-butene, 1-pentene, 3-methyl-1-butene, 4-methyl-1-pentene, 4-methyl-1-hexene, 5-methyl-1-hexene and mixtures thereof. Polypropylene not only includes homopolymers of propylene, but also propylene copolymers comprised of at least 50 mole % (mol. %) (preferably at least 70 mol. %) of a propylene unit and a minor proportion of a monomer copolymerizable with propylene and combinations of at least 50 percent by weight of the propylene homopolymer with another polymer The polypropylene may be oriented and/or biaxially oriented.

The term polyethylene as used herein includes homopolymers of ethylene and copolymers comprised of at least 50 mole percent of a ethylene unit (preferably at least 70 mole percent) and a minor (i.e., less than 50%) proportion of a monomer copolymerizable with the ethylene unit.

The term high density polyethylene (HDPE) polymer as used herein is generally defined as an ethylenic polymer having a specific gravity of from about 941 kg/m$^3$ to about 970 kg/m$^3$. The term HDPE as used herein may also include combinations of two or more different homopolymers classified as HDPEs.

The term medium density polyethylene (MDPE) polymer as used herein is generally defined as an ethylenic polymer having a specific gravity between the LDPEs and the HDPEs (i.e., from about 926 kg/m$^3$ to about 940 kg/m$^3$). The term MDPE as used herein may also include combinations of two or more different homopolymers classified as MDPEs.

The terms low density polyethylene (LDPE) and linear low density polyethylene (LLDPE) polymers as used herein are generally defined as ethylenic polymers having specific gravities of from about 910 kg/m$^3$ to about 925 kg/m$^3$. The terms low density polyethylene and linear low density polyethylene as used herein also include combinations of two or more different homopolymers that are classified as low density polyethylenes or linear low density polyethylenes. Suitable low or linear low density polyethylenes which are useful in embodiments of the invention include, but are not limited to, ultra low density polyethylene, very low density polyethylene (VDPE), elastomers, plastomers, metallocene-catalyzed linear low density polyethylene (mLLDPE) and combinations thereof.

The cyclic olefin copolymers of the present invention generally have a molecular weight distribution or polydispersity index (MWD=$M_w/M_n$ "MWD") from about 2.0 to about 50, and preferably from about 2.0 to about 25. The cyclic olefin copolymers of the present invention are generally transparent and are generally miscible or compatible with certain polymers such as polyethylene.

The cyclic olefin copolymers generally have a density of from about 0.90 g/cm$^3$ to about 1.10 g/cm$^3$, typically from about 0.95 g/cm$^3$ to about 1.05 g/cm$^3$, and more typically from about 1.00 g/cm$^3$ to about 1.03 g/cm$^3$. The heat deflection temperature (HDT, measured at 66 psi) of cyclic olefin copolymers generally is from about 50° C. to about 200° C., and typically from about 70° C. to about 170° C.

The melt flow index (MI) of the cyclic olefin copolymers is generally from about 1 g/10 min. to about 100 g/10 min and typically from about 4 g/10 min. to about 20 g/10 min. at 115° C. (239° F.) above its corresponding HDT as determined by ISO 1133

The cyclic olefin copolymers may be made from copolymers of ethylene and norbornene. The mole % of ethylene and norbornene may vary with respect to each other. For example, the amount of norbornene is generally from about 10 mol. % to about 90 mol. %, with the remainder being ethylene (from about 10 mol. % to about 90 mol. %). The amount of norbornene is typically from about 20 mol. % to about 70 mol % with the remainder being ethylene. The amount of norbornene is more typically from about 35 mol. % to about 60 mol % with the remainder being ethylene. The cyclic olefin copolymers may be made using metallocene catalysts The glass transition temperature ($T_g$) of the cyclic olefin copolymer is generally greater than about 20° C., typically greater than about 50° C., and preferably greater than about 75° C., as measured by ASTM D3418. The glass transition temperature of the cyclic olefin copolymer may be greater than about 100° C. or about 150° C. as measured by ASTM D3418. The glass transition temperature (Tg) of the cyclic olefin copolymers increases as the mole percent (mol. %) of norbornene in the copolymer increases. For example, the glass transition temperature ($T_g$) of a cyclic olefin copolymer comprising 20 mol. % norbornene and 80 mol. % ethylene is about 25° C., while the glass temperature transition of a cyclic olefin copolymer comprising 70 mol. % norbornene and 30 mol % ethylene is about 210° C. The glass temperature transition ($T_g$) of a cyclic olefin copolymer comprising 30 mol. % norbornene and 70 mol % ethylene is about 75° C., while a cyclic olefin copolymer comprising 60 mol % norbornene and 40 mol. % ethylene is about 180° C.

The flexural modulus of the cyclic olefin copolymer is generally from about 300,000 psi to about 600,000 psi, and more specifically from about 400,000 psi to about 500,000 psi as measured by ASTM D790 The tensile modulus of the cyclic olefin copolymers is generally from about 300,000 psi to about 600,000 psi, and more specifically from about 400,000 psi to about 500,000 psi, as determined by ISO 527.

The moisture barrier properties of the cyclic olefin copolymer is generally from about 0.01 g-mm/m$^2$/day to about 0.06 g-mm/m$^2$/day at 23° C. at 85% relative humidity, and more specifically from about 0.023 g-mm/m$^2$/day to about 0.045 g-mm/m$^2$/day at 23° C. at 85% relative humidity as measured by DIN 53 122

Useful cyclic olefin copolymers for use in embodiments of this invention are available from several companies. For example, Ticona, a business of Celanese AG, in Summit, N.J. has cyclic olefin copolymers available Other companies that have cyclic olefin copolymers available include Nippon Zeon Co., Ltd. (Japan) and Mitsui Chemical (Japan) Nippon Zeon Co, Ltd. has commercially available cyclic olefin copolymers (COCs) under the designation ZEONEX®. Ticona, a business of Celanese AG, has commercially available cyclic olefin copolymers (COCs) under the designation TOPAS® The cyclic olefin copolymers which are commercially available under the designation TOPAS® are believed to be prepared with feedstocks of norbornene and ethylene and the use of a metallocene catalyst. There are believed to be at least four grades of TOPAS® resins available (TOPAS® 8007, TOPAS® 6013, TOPAS® 6015, and TOPAS® 6017). The four grades of TOPAS® resins available have glass transition temperatures, $T_g$, of 85, 140, 160 and 180° C., respectively. The corresponding norbornene levels of the four grades of TOPAS® resins are believed to be about 35, 48, 55 and 59 mol %.

It is contemplated that additional materials may be added in forming the end stops. These materials include, but are not limited to, color, slip and process aids, antiblocks, talc, fillers, calcium carbonate, glass fibers, and the like. These materials may be added in a sufficient amount so that the ends stops have the properties which are desired for a given application It is also contemplated that any material which adds strength and stiffness properties may be added in forming the end stops Although the end stops have been described herein as being formed by using ultrasonic energy, it is contemplated that the end stops may instead be formed using a heating process. For example, at least one heated bar may be pressed against the ends of the fastener to soften the material that is used to form the end stops, the end stops may be formed, and the end stops may be cooled. The bar(s) may be heated, for example, with a laser, infrared, or vibrational energy. The end stops may be cooled using convention cooling methods such as, but not limited to, using cold blocks, compressed air, water-cooled blocks, and the like The end stops may also be formed using different molding processes including, but not limited to, injection molding, thermoset molding, and thermoform molding.

EXAMPLE 1

Slider Off End Test

Forty sandwich bags (Bags 1-40) were formed having ultrasonically smashed end stops shaped as shown in FIGS. 3a-3b. Specifically, Bags 1-40 were formed using a Branson 2000 series welder available from Branson Ultrasonics in Danbury, Conn. The weld mode was set at the energy setting. The weld energy was set at 40 J-44 Joules and the amplitude was set at 100%. A horn shaped as shown in FIG. 3b was used and had a machine tip diameter of ⅞ inch.

The forty bags (Bags 1-40) included a slider and a reclosable fastener having ultrasonically smashed end stops formed at opposing ends of the fastener The end stops in Bags 1-10 comprised approximately 100 wt % LDPE. The end stops in Bags 1-10 also comprised less than approximately 2 wt. % of additives. The additives included a white pigment and a slip and process aid available from Ampacet in Tarrytown, N.Y.

The end stops in Bags 11-20 comprised approximately 15 wt. % HDPE and approximately 83 wt. % LDPE. The end stops in Bags 11-20 also comprised less than approximately 2 wt. % of additives. The additives included a white pigment and a slip and process aid available from Ampacet in Tarrytown, N.Y.

The end stops in Bags 21-30 comprised approximately 45 wt % HDPE and approximately 53 wt % LDPE The end stops in Bags 21-30 also comprised approximately 2 wt % of additives. The additives included a white pigment and a slip and process aid available from Ampacet in Tarrytown, N.Y.

The end stops in Bags 31-40 comprised approximately 45 wt. % HDPE, approximately 10 wt. % TOPAS® 6013, and approximately 43 wt. % LDPE The end stops in Bags 31-40 also comprised approximately 2 wt. % of additives The additives included a white pigment and a slip and process aid available from Ampacet in Tarrytown, N.Y.

The sliders of Bags 1-40 were moved to the open ends of the respective bags. The tracks of each bag were cut off of the top of the respective bag, leaving track portions approximately ½ inch wide The approximately ½ inch wide track portions of each of Bags 1-40 were then cut to 4 inch long test samples using the track end containing the slider The 4 inch long test samples of each of Bags 1-40 were tested in a SINTECH® tensile strength tester available from MTS Systems in Cary, N.C. to measure the slider off end force (i.e., the amount of amount of force required to pull the slider off of the end of the track by pulling on the slider) using the following procedure.

1. The jaws of the tensile strength tester were set at a jaw separation of 4 inches; and the speed setup for 20.0 in/min;
2. The test sample was placed into the tensile strength tester so that the slider adapter was located in the top jaw of the equipment;
3. The tensile strength tester was calibrated to zero out the weight of the slider adapter;
4. The slider was moved into the slider adapter with the slider against the clip on the test sample,
5. The other end of the test sample was placed into the bottom jaw of the tensile strength tester,
6. The jaws of the tensile strength tester were closed and the jaws were pulled in opposite directions so that the slider was resisted against the end stops; and
7. The force or peak load at which the slider came off of the end of the track was measured in pounds force (lbs-f).

The peak load measurements for the closed end of Bags 1-10 are shown below in Table A.

TABLE A

BAGS 1-10

| Bag Number | Peak Load (lbs-f) |
|---|---|
| 1 | 3.6 |
| 2 | 5.7 |
| 3 | 5.2 |
| 4 | 5.6 |
| 5 | 5.0 |
| 6 | 5.7 |
| 7 | 5.1 |
| 8 | 5.1 |
| 9 | 5.7 |
| 10 | 4.8 |

The mean peak load measurement for Bags 1-10 was 5 1

The peak load measurements for the closed end of Bags 11-20 are shown below in Table B

TABLE B

BAGS 11-20

| Bag Number | Peak Load (lbs-f) |
|---|---|
| 11 | 6.6 |
| 12 | 6.2 |
| 13 | 6.8 |
| 14 | 6.4 |
| 15 | 5.8 |
| 16 | 5.1 |
| 17 | 6.1 |
| 18 | 6.5 |
| 19 | 6.8 |
| 20 | 6.6 |

The mean peak load measurement for Bags 11-20 was 6.3

The mean peak load measurements for the closed end of Bags 21-30 are shown below in Table C

TABLE C

BAGS 21-30

| Bag Number | Peak Load (lbs-f) |
|---|---|
| 21 | 8.5 |
| 22 | 6.7 |
| 23 | 7.6 |
| 24 | 7.6 |
| 25 | 8.0 |
| 26 | 7.0 |
| 27 | 6.8 |
| 28 | 8.7 |
| 29 | 8.1 |
| 30 | 7.4 |

The mean peak load measurement for Bags 21-30 was 7.6.

The peak measurements for the closed end of Bags 31-40 are shown below in Table D.

TABLE D

BAGS 31-40

| Bag Number | Peak Load (lbs-f) |
|---|---|
| 31 | 8.5 |
| 32 | 8.9 |
| 33 | 7.8 |
| 34 | 7.9 |

TABLE D-continued

BAGS 31-40

| Bag Number | Peak Load (lbs-f) |
|---|---|
| 35 | 7.8 |
| 36 | 8.8 |
| 37 | 8.1 |
| 38 | 8.6 |
| 39 | 8.6 |
| 40 | 7.8 |

The mean peak load measurement for Bags 31-40 was 8 3

The results shown above in Tables A-D demonstrate that the force required to remove the slider from the bag ends increased with the presence of a larger amount of HDPE in the end stops. In particular, the data shown in Tables A-D demonstrates that Bags 11-20 which each contained approximately 15 wt. % HDPE required more force To remove the slider from the bag end than Bags 1-10 which did not contain HDPE. The data shown in Tables A-D also demonstrates that Bags 21-30 and Bags 31-40 which each contained approximately 45 wt. % HDPE required more force to remove the slider from the bag end than Bags 11-20 which contained only 15 wt % HDPE and from the bag end than Bags 1-10 which did not contain HDPE. The data shown in Tables B-D further demonstrates that Bags 21-30 and 31-40 required more force to remove the slider from the bag end than Bags 11-20 which contained a lower percentage of HDPE. The data shown in Tables B-D also demonstrates that Bags 31-40 containing 10 wt. % TOPAS® 6013 required more force to remove the slider from the bag end than Bags 21-30 which did not contain TOPAS® 6013

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A polymeric bag comprising:
   first and second opposing body panels fixedly connected to each other along a pair of sides and a bottom bridging the pair of sides;
   a reclosable fastener extending along a mouth formed opposite the bottom, the fastener including a pair of interlocking flexible plastic tracks, the pair of plastic tracks including a male track including a male profile and a female track including a female profile, the fastener having a thickness when the pair of plastic tracks are interlocked;
   a slider slidably mounted to the fastener for movement between a closed position and an open position; and
   first and second end stops located at opposite ends of the fastener, each of the end stops being formed integrally from the fastener at the opposite ends of the fastener with the male and female tracks permanently joined at the end stops, the first and second end stops protruding upwardly beyond an upper edge of the tracks a distance adequate to engage the slider and prevent or inhibit movement of the slider past the respective ends of the fastener, the first and second end stops comprising high density polyethylene and a cyclic olefin copolymer, the first and second end stops each having a thickness less than the thickness of the fastener.

2. The bag of claim 1, wherein the first and second end stops comprise about 45 wt. % high density polyethylene, about 10 wt. % cyclic olefin copolymer, and about 43 wt. % low density polyethylene.

3. The polymeric bag of claim 1, wherein the opposing body panels are joined by a seal extending along the sides and a seal extending along the bottom.

4. The polymeric bag of claim 1, wherein the opposing body panels are joined by a seal extending along the sides, and a fold extending along the bottom.

5. The polymeric bag of claim 1, wherein a lower portion of the male and female profiles remain unaltered.

6. A polymeric bag comprising:
first and second opposing body panels fixedly connected to each other along a pair of sides and a bottom bridging the pairs of sides;
a reclosable fastener extending along a mouth formed opposite the bottom, the fastener including a pair of interlocking flexible plastic tracks, the pair of plastic tracks including a male track including a male profile and a female track including a female profile, the fastener having a thickness when the pair of plastic tracks are interlocked;
a slider slidably mounted to the fastener for movement between a closed position and an open position; and
first and second end stops located at opposite ends of the fastener, each of the end stops being formed integrally from the fastener at the opposite ends of the fastener with the male and female tracks permanently joined at the end stops, the first and second end stops protruding upwardly beyond an upper edge of the tracks a distance adequate to engage the slider and prevent or inhibit movement of the slider past the respective ends of the fastener, the first and second end stops compromising high density polyethylene and low density polyethylene, the first and second end stops each having a thickness less than the thickness of the fastener.

7. The bag of claim 6, wherein the first and second end stops comprise at least 53 wt. % low density polyethylene.

8. The bag of claim 6, wherein the first and second end stops comprise at least 15 wt. % high density polyethylene.

9. The polymeric bag of claim 6, wherein the opposing body panels are joined by a seal extending along the sides and a seal extending along the bottom.

10. The polymeric bag of claim 6, wherein the opposing body panels are joined by a seal extending along the sides, and a fold extending along the bottom.

11. The polymeric bag of claim 6, wherein a lower portion of the male and female profiles remain unaltered.

12. A polymeric bag comprising:
first and second opposing body panels fixedly connected to each other along a pair of sides and a bottom bridging the pair of sides;
a reclosable fastener extending along a mouth formed opposite the bottom, the fastener including a pair of interlocking flexible plastic tracks, the pair of plastic tracks including a male track including a male profile and a female track including a female profile, the fastener having a thickness when the pair of plastic tracks are interlocked;
a slider slidably mounted to the fastener for movement between a closed position and an open position; and
first and second end stops located at opposite ends of the fastener, each of the end stops being formed integrally from the fastener at opposite ends of the fastener with the male and female tracks permanently joined at the end stops, the first and second end stops protruding upwardly beyond an upper edge of the tracks a distance adequate to engage the slider and prevent or inhibit movement of the slider past the respective ends of the fastener, the first and second end stops comprising at least one of low density polyethylene and linear low density polyethylene, the first and second end stops each having a thickness less than the thickness of the fastener.

13. The polymeric bag of claim 12, wherein the opposing body panels are joined by a seal extending along the sides and a seal extending along the bottom.

14. The polymeric bag of claim 12, wherein the opposing body panels are joined by a seal extending along the sides, and a fold extending along the bottom.

15. The polymeric bag of claim 12, wherein a lower portion of the male and female profiles remain unaltered.

16. The polymeric bag of claim 12, wherein the first and second end stops further comprise ultra low density polyethylene, very low density polyethylene, elastomers, plastomers, metallocene-catalyzed linear low density polyethylene, or combinations thereof.

17. The polymeric bag of claim 16, wherein the first and second end stops comprise from about 99 wt. % to about 1 wt. % low density polyethylene or linear low density polyethylene.

* * * * *